Feb. 18, 1936. L. LEBEL 2,031,114
DEMOUNTABLE WHEEL
Filed Jan. 4, 1934 2 Sheets-Sheet 1
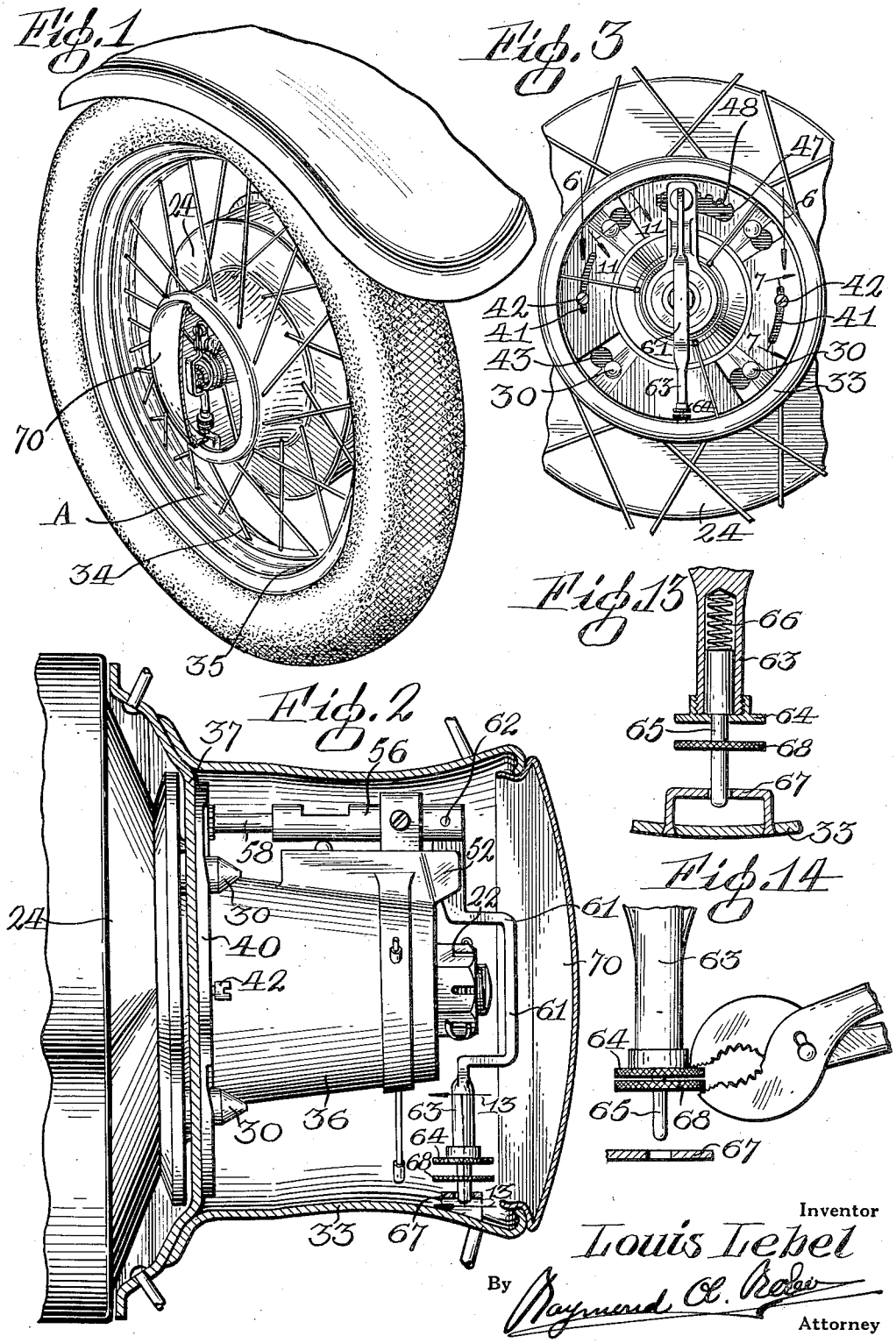

Feb. 18, 1936. L. LEBEL 2,031,114
DEMOUNTABLE WHEEL
Filed Jan. 4, 1934 2 Sheets-Sheet 2
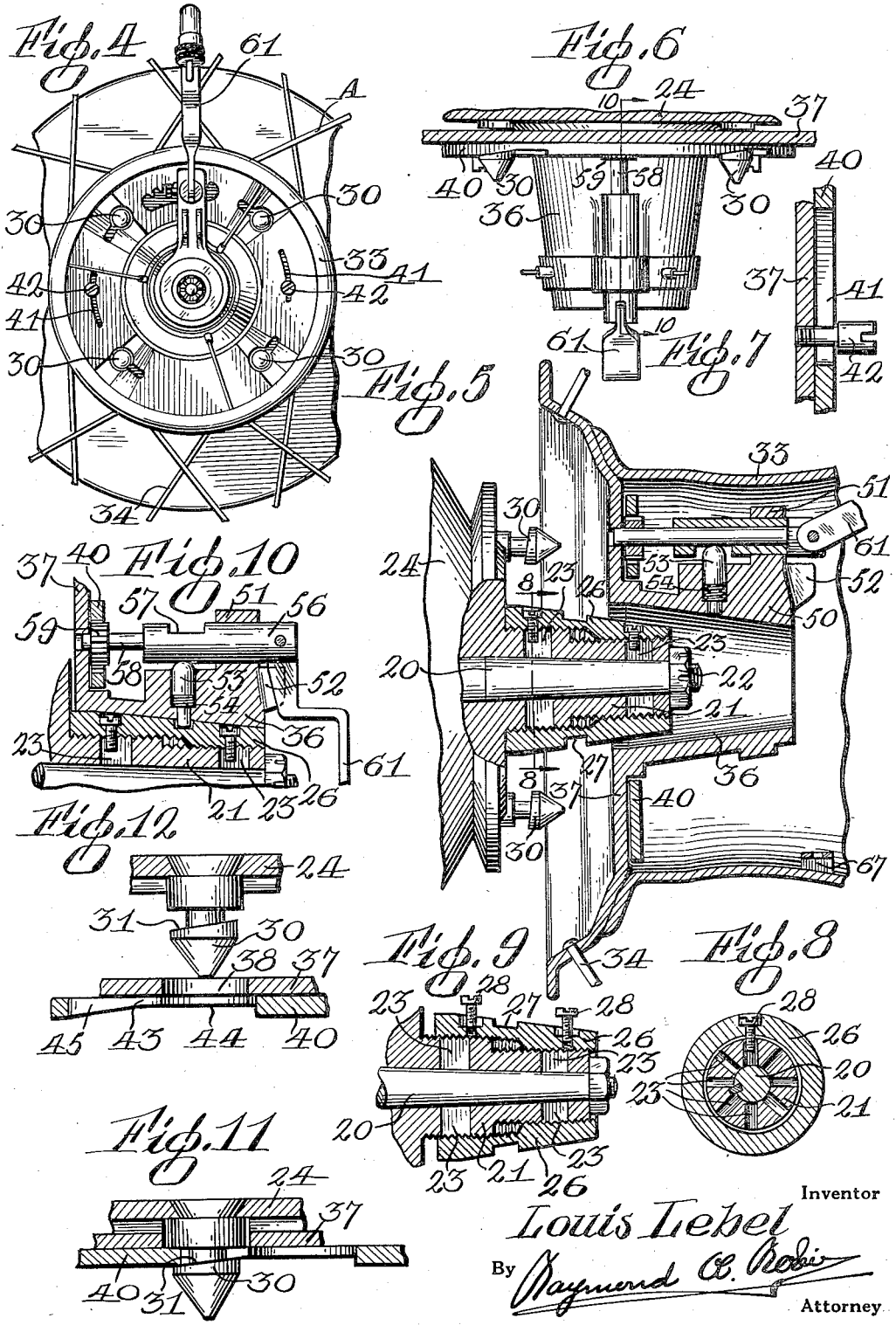
Inventor
Louis Lebel
By Raymond C. Robie
Attorney Patented Feb. 18, 1936

2,031,114

UNITED STATES PATENT OFFICE 2,031,114

DEMOUNTABLE WHEEL

Louis Lebel, Sherbrooke, Quebec, Canada, assignor to Joseph J. Rosenthal, New York, N. Y.

Application January 4, 1934, Serial No. 705,223

4 Claims. (Cl. 301—9)

The present invention relates to improvements in demountable wheel construction and has particular reference to mechanism for fastening the same to a hub.

An object of the invention is to provide a demountable wheel attaching mechanism designed so that the body section of the wheel may be easily released and removed from the hub at all times.

A further object of the invention is the provision of a demountable wheel having attaching mechanism designed to enable convenient fastening of the wheel body to a hub or its removal therefrom.

Another object of the invention is the provision of a demountable wheel of the above character embodying a body section provided with fastening mechanism engageable with the hub and studs secured on a vehicle axle so that the body may be securely attached to or dismounted from the hub.

Still another object of the invention is the provision of a demountable wheel having fastening mechanism provided with a safety locking device which will assure firm engagement of the wheel body with the hub.

A still further object of the invention is the provision of a demountable wheel having fastening means constructed so as to enable adjustment of the hub sleeve so that the co-operative fastening elements may be readily engaged.

Other objects and advantages of the invention will become apparent as the description progresses.

In the accompanying drawings forming a part of this specification and in which like reference characters are employed to designate corresponding parts throughout the same:

Figure 1 is a perspective view showing the assembled wheel mounted on a vehicle, Figure 2 is an enlarged longitudinal section through the wheel body shell, Figure 3 is an end view of the central part of the wheel with the hub cap removed, showing the actuating lever in fastening position, Figure 4 is a similar view showing the lever in fastener actuating position, Figure 5 is an axial section through the hub and central portion of the wheel body with the body partly dismounted, Figure 6 is an enlarged section taken on the line 6—6 of Figure 3, Figure 7 is a fragmentary section taken on the line 7—7 of Figure 3.

Figure 8 is a transverse section taken on the line 8—8 of Figure 5,

Figure 9 is a longitudinal section through the hub showing the hub sleeve in an outwardly adjusted position, Figure 10 is a longitudinal section taken on the line 10—10 of Figure 6, Figure 11 is an enlarged fragmentary section taken on the line 11—11 of Figure 3, Figure 12 is a similar view showing the parts in separated relation, Figure 13 is a longitudinal section taken on the line 13—13 of Figure 2, and Figure 14 is a fragmentary elevation showing the manner of releasing the actuating lever.

Referring to the drawings, wherein for the purpose of illustration is shown a preferred embodiment of the invention, the numeral 20 designates a vehicle axle, in the present instance the rear axle of an automobile.

Upon the axle is initially fitted the inner hub section of the wheel which embodies a stepped exteriorly threaded hub core 21 maintained in position by means of a hub nut 22. Adjacent the inner and outer ends of the core 21 are provided a plurality of radial slots 23. Formed integral with or secured to the hub core 21 is a brake drum generally indicated at 24.

Upon the hub core 21 is fitted an exterior sleeve 26 interiorly threaded for engagement with the exterior of the core and having an exterior tapering contour. At the intermediate portion the sleeve 26 is formed with an annular groove 27. Adjacent the inner and outer ends of the sleeve 26 are provided radial screws 28 engageable with the radial slots 23 in the core for rigidly securing the sleeve in a predetermined axial position on the core.

Projecting from the flange or side wall of the brake drum structure 24 is a plurality of uniformly spaced studs 30 extending parallel to the axis of the hub and each preferably embodying a tapered head portion and a shank portion of reduced diameter. As shown to advantage at Figure 12 the innerside of each stud head is bevelled, as indicated at 31.

A wheel body section, generally indicated at A and essentially embodying a centrally disposed annular shell 33, spokes 34 and a rim 35, is adapted for detachable engagement with the hub section. Within the body shell 33 is disposed a frusto-conical hub engaging socket member 36 having an interior taper conforming to the tapered form of the hub sleeve 26 for snug fitting engagement thereon. The inner end of the socket member 36 is formed integral with an inner shell flange 37. The flange 37 is provided with apertures 38 adapted to receive the studs 30 therethrough when the wheel is assembled.

Against the outer side of the shell flange 37 is mounted an annular fastening ring 40 formed with a pair of diametrically opposed arcuate guide slots 41 engaging headed pins 42 attached to the flange 37 for attaching the ring to the flange. The guide slots 41 are so formed as to permit a partial revolution of the ring in a clockwise or counter clockwise direction. The ring 40 is also provided, at spaced intervals, with stud engaging slots 43 corresponding in number to the studs of the hub and enlarged at one end to provide an aperture designed to receive the head of each stud 30 therethrough while the reduced portion of the slot is formed to engage the shank portion of the stud and is narrower than the larger diameter of the stud head. In the exterior face of the ring 40 are formed depressions coincident with the slots 43 the depressions being of greatest depth at the enlarged part of the slot, as indicated at 44, and having a bevel or inclination 45 at the reduced part of the slot conforming approximately to the bevel 31 at the underside of each stud head 30. The fastening ring 40 is furthermore provided with an enlarged arcuate slot 47 having teeth 48 formed at the outer edge constituting a segmental rack.

At one side of the socket member 36 is formed a shoulder 50 having a radially extending bearing ring 51 formed thereon and provided at the outer end with a pair of spaced parallel ribs 52. In a bore through the intermediate portion of the shoulder 50 is slidably fitted a locking pin 53 reduced at one end to limit the projection of the pin and normally urged to a retracted position by means of a coiled compression spring 54. When the pin 53 is projected inwardly of the socket member it is adapted to engage the groove 27 in the hub sleeve 26.

Within the bearing 51 is rotatably mounted an elongated sleeve 56 extending axially at one side of the socket member 36 and provided, at the intermediate portion, with a notch 57 coinciding with that portion of the sleeve engaging the pin 53 to provide a cam surface. Within the sleeve is rigidly secured a shaft 58 projecting inwardly therefrom and having fixed on the inner end portion a spur gear 59 disposed within the slot 47 of the fastening ring and meshing with the teeth of the rack 48. To the outer end of the sleeve 56 is pivotally connected an actuating lever 61.

The lever 61 is formed with an outward offset at the intermediate portion to clear the hub fastening nut 22, one end thereof being connected with the sleeve 56 by means of a pivot pin 62 while the opposed end is enlarged to form a tubular shank 63. At the outer extremity of the shank 63 is formed an annular flange 64.

Within the shank 63 is slidably fitted a lever fastening pin 65 formed with a shoulder to limit its outward movement and normally urged to a projecting position by means of a coiled compression spring 66 disposed within the shank and acting against the pin. The outer end of the pin 65 is preferably rounded and is disposed to engage an aperture in a U-shaped bracket 67 attached to the wheel body shell. Upon the outer part of the pin 65 is secured a collar 68 disposed at an intermediate position to enable convenient retraction of the pin.

The exterior opening of the body shell 33 is normally, in assembly, closed by means of a detachable hub cap 70.

To replace one of the wheels and the tire mounted thereon, the cap 70 is removed from the wheel and the fastening pin 65 retracted in the tubular end of the lever 61 to disengage the same from the bracket 67. The pin 65 may be ordinarily retracted by hand but if not moved for some time may be difficult to actuate, in which case retraction may be effected by pliers, as shown at Figure 14. The lever 61 is swung outwardly to disengage the ribs 52 and turned or swung about so as to effect a half turn movement of the sleeve 56 and shaft 58 connected therewith.

As the sleeve and shaft are so actuated the outer end of the pin 53 bearing against the cam surface of the sleeve will be forced outwardly by the spring 54 from the groove 27 in the hub sleeve. Simultaneously with the release of the safety locking pin 53 the rotary operation of the shaft 58 will cause rotation of the gear 59 and partial revolution of the fastening ring 40 in a counterclockwise direction from the fastening position shown at Figure 3 to the releasing position shown at Figure 4. The wheel body may thus be readily dismounted from the axle and hub.

To assemble a replacing wheel body the mechanism is disposed in the releasing position, as shown at Figure 4, and slidably fitted on the hub section, the lever being thereafter rotated and replaced to the locking position shown at Figures 2 and 3.

As will be noted from Figure 11 the under bevel side 31 of each stud 30 is disposed to engage the bevelled surface 45 of the fastening ring when these elements are in co-operative fastening relation. To maintain a proper relation between the ring and the studs for convenient and effective engagement, it is merely necessary to retain the axially adjustable hub sleeve 26 in proper position on the hub core, the adjustment being effected to compensate for wear or dislocation of the parts.

It is to be understood that the form of my invention herein shown and described is to be taken as a preferred example of the same, and that various changes as to the shape, size and arrangement of parts may be resorted to without departing from the spirit of the invention or the scope of the subjoined claims.

Having thus described my invention, I claim:—

1. In demountable wheel attaching mechanism the combination of a hub core adapted to be secured upon a vehicle axle, a radial flange connected with the core, a sleeve threaded on the hub core and adapted to be axially adjusted thereon, means for securing the sleeve in adjusted position on the core, studs projecting from the radial flange, and a demountable wheel body adapted to be fitted over the sleeve, the said body having fastening means co-operative with the studs to secure the body on the hub and said sleeve co-operating to permit accurate positioning of the fastening means with respect to the studs.

2. In demountable wheel fastening mechanism the combination of a hub having a radial flange at one end, a plurality of studs projecting outwardly from the radial flange, a socket member mounted in the wheel body adapted to be fitted on the hub, screw threaded means on said hub adapted to receive the socket member and adjustable to maintain constant the position of said member with respect to the studs, a flange about one end of the socket member having apertures for receiving the studs therethrough, a ring revolubly attached to the outer side of the flange having apertures operable to effect fastening engagement with the studs, rack and gear mechanism operable to turn the ring, a shaft connected with the gear, and a lever attached to the end of the shaft for rotating the said shaft and gear.

3. In demountable wheel fastening mechanism the combination of a hub having a radial flange at one end, a plurality of studs projecting outwardly from the radial flange, a socket member mounted in the wheel body adapted to be fitted on the hub, a flange about one end of the socket member having apertures for receiving the studs therethrough, a ring revolubly attached to the outer side of the flange having apertures operable to effect fastening engagement with the studs, rack and gear mechanism operable to turn the ring, a shaft connected with the gear, a lever attached to the end of the shaft for rotating the said shaft and gear, a pin slidably fitted in the socket engageable with the hub, and means for actuating the pin to a hub locking position when the fastening ring is actuated to a stud engaging position.

4. In combination with a vehicle axle, demountable wheel fastening mechanism comprising a hub adapted to be secured on the vehicle axle, a sleeve threaded over said hub and adjustable axially thereon, a radial flange associated with the hub, a plurality of studs projecting from said flange, said studs each having a circumferential groove cut therein with a face of said groove angularly disposed to form a cam surface, a wheel adapted to be fitted over said sleeve and having a socket member formed to engage said sleeve, means on the wheel adapted to engage the studs projecting through apertures of the wheel socket member, said means embodying cam faces cooperating with that of the studs, and means on the axle for locking the sleeve thereon so as to permit accurate positioning of the socket member with respect to the cam faces of the studs.

LOUIS LEBEL.